United States Patent
Yang

(10) Patent No.: US 11,916,418 B2
(45) Date of Patent: Feb. 27, 2024

(54) CHARGING METHOD AND SYSTEM, CHARGING BOX, AND BLUETOOTH EARPHONES

(71) Applicant: GOERTEK INC., Shandong (CN)

(72) Inventor: Zongxu Yang, Shandong (CN)

(73) Assignee: GOERTEK, INC., Shandong (CN)

( * ) Notice: Subject to any disclaimer, the term of this patent is extended or adjusted under 35 U.S.C. 154(b) by 0 days.

(21) Appl. No.: 17/996,414

(22) PCT Filed: Oct. 31, 2020

(86) PCT No.: PCT/CN2020/125626
§ 371 (c)(1),
(2) Date: Oct. 17, 2022

(87) PCT Pub. No.: WO2021/212802
PCT Pub. Date: Oct. 28, 2021

(65) Prior Publication Data
US 2023/0238809 A1    Jul. 27, 2023

(30) Foreign Application Priority Data
Apr. 22, 2020 (CN) .......................... 202010325163.2

(51) Int. Cl.
H01M 10/44      (2006.01)
H01M 10/46      (2006.01)
H02J 7/00       (2006.01)
H04R 1/10       (2006.01)

(52) U.S. Cl.
CPC .......... *H02J 7/0044* (2013.01); *H04R 1/1025* (2013.01)

(58) Field of Classification Search
CPC .... H02J 7/0044; H02J 7/0042; H02J 7/00034; H02J 7/00712; H02J 7/0048; H02J 7/0013; H04R 5/033; H04R 1/1025
USPC ................. 320/107, 114, 115, 116, 132, 148
See application file for complete search history.

(56) References Cited

U.S. PATENT DOCUMENTS

2018/0205241 A1    7/2018  Zhang et al.
2020/0359123 A1*  11/2020  Li ............................. H02J 7/00

FOREIGN PATENT DOCUMENTS

| CN | 108599304 A | 9/2018 |
| CN | 110198068 A | 9/2019 |
| CN | 110224457 A | 9/2019 |
| CN | 110311434 A | 10/2019 |
| CN | 110854945 A | 2/2020 |

(Continued)

*Primary Examiner* — Edward Tso
(74) *Attorney, Agent, or Firm* — LKGlobal

(57) ABSTRACT

A charging method and system, a charging box and Bluetooth earphones are disclosed. The charging method is applied to the charging box. The charging method comprises: when it is detected that Bluetooth earphones are placed in the charging box, acquiring current capacity information of the Bluetooth earphones; determining a number of Bluetooth earphones according to the current capacity information; if the number of Bluetooth earphones is two, calculating a capacity difference and a total charging capacity required according to a first current capacity and a second current capacity in the current capacity information; and acquiring a chargeable capacity of the charging box, comparing the chargeable capacity with the total charging capacity required and the capacity difference, and charging the Bluetooth earphones according to comparison results.

8 Claims, 2 Drawing Sheets

(56) References Cited

FOREIGN PATENT DOCUMENTS

| | | |
|---|---|---|
| CN | 111049219 A | 4/2020 |
| CN | 111049230 A | 4/2020 |
| CN | 111491235 A | 8/2020 |
| WO | 2020050853 A1 | 3/2020 |

\* cited by examiner

CHARGING METHOD AND SYSTEM, CHARGING BOX, AND BLUETOOTH EARPHONES

CROSS-REFERENCE TO RELATED APPLICATIONS

This Application is a U.S. National-Stage entry under 35 U.S.C. § 371 based on International Application No. PCT/CN2020/125626, filed Oct. 31, 2020, which was published under PCT Article 21(2) and which claims priority to Chinese Application No. 202010325163.2, filed Apr. 22, 2020, which are all hereby incorporated herein in their entirety by reference.

TECHNICAL FIELD

This application pertains to the technical field of portable listening devices, in particular to a charging method and system, a charging box and Bluetooth earphones.

BACKGROUND

With the development of Bluetooth technology as a short-range wireless technology, intelligent and wireless trends have been deeply affected Bluetooth earphones products. As one of perfect combinations of intelligent and wireless trends, TWS (true wireless stereo) earphones have become the most popular product form in the current Bluetooth earphones market.

In the daily use of Bluetooth earphones such as charging TWS earphones by a charging box, the performance of the whole system of Bluetooth earphones and charging box is often discounted. For example, the charging box does not charge the left and right earphones evenly, resulting in the failure of the left and right earphones to reach the longest standby time after charging. Therefore, how to effectively plan the charging process of Bluetooth earphones and charging box and improve the overall energy efficiency of Bluetooth earphones system is an urgent problem to be solved. In addition, other objects, desirable features and characteristics will become apparent from the subsequent summary and detailed description, and the appended claims, taken in conjunction with the accompanying drawings and this background.

SUMMARY

The main object of the present disclosure is to provide a charging method and system, a charging box and Bluetooth earphones, which aim to realize the reasonable distribution of electric energy of the charging box and improve the overall energy efficiency of the Bluetooth earphones system.

In order to achieve the above object, the present disclosure provides a charging method applied to a charging box, and the charging method comprises:
  when the charging box detected that Bluetooth earphones are placed in the charging box, acquiring current capacity information of the Bluetooth earphones;
  determining a number of Bluetooth earphones according to the current capacity information;
  if the number of Bluetooth earphones is two, calculating a capacity difference and a total charging capacity required according to a first current capacity and a second current capacity in the current capacity information; and
  acquiring a chargeable capacity of the charging box, comparing the chargeable capacity with the total charging capacity required and the capacity difference, and charging the Bluetooth earphones according to comparison results.

Optionally, the step of calculating the capacity difference and the total charging capacity required according to the first current capacity and the second current capacity in the current capacity information comprises:
  calculating the capacity difference according to the first current capacity and the second current capacity in the current capacity information and a preset charging efficiency;
  acquiring a first total capacity of the Bluetooth earphones corresponding to the first current capacity, and acquiring a second total capacity of the Bluetooth earphones corresponding to the second current capacity;
  calculating a first capacity to be charged according to the first total capacity and the first current capacity, and calculating a second capacity to be charged according to the second total capacity and the second current capacity; and
  calculating the total charging capacity required according to the first capacity to be charged, the second capacity to be charged and the preset charging efficiency.

Optionally, the step of charging the Bluetooth earphones according to comparison results comprises:
  if the chargeable capacity is greater than or equal to the total charging capacity required, charging the two Bluetooth earphones respectively until the charging of the two Bluetooth earphones is completed.

Optionally, the step of charging the Bluetooth earphones according to comparison results comprises:
  if the chargeable capacity is greater than or equal to the capacity difference and less than the total charging capacity required, calculating a target charging capacity of the Bluetooth earphones according to the chargeable capacity, the preset charging efficiency, the first current capacity and the second current capacity;
  sending the target charging capacity to the two Bluetooth earphones respectively, and charging the two Bluetooth earphones respectively; and
  when receiving charging stop information sent by either of the two Bluetooth earphones based on the target charging capacity, stop charging a corresponding Bluetooth earphone according to the charging stop information.

Optionally, the step of charging the Bluetooth earphones according to comparison results comprises:
  if the rechargeable capacity is less than the capacity difference, taking a Bluetooth earphone with a lower capacity in the two Bluetooth earphones as the target Bluetooth earphone; and
  charging the target Bluetooth earphone, and disconnecting a non-target Bluetooth earphone from a charging circuit.

Optionally, after the step of determining the number of Bluetooth earphones according to the current capacity information, the method further comprises:
  if there is one Bluetooth earphone, charging the one Bluetooth earphone.

Optionally, the charging method further comprises:
  during the charging process, acquiring the current remaining capacity of the charging box in real time, and stopping charging the Bluetooth earphones when the current remaining capacity is less than or equal to the preset charging termination capacity.

In addition, to achieve the above object, the present disclosure also provides a charging method applied to Bluetooth earphones. The charging method comprises the following steps:

when it is detected that Bluetooth earphones are placed in the charging box, acquiring a current capacity via a capacity meter and sending it to the charging box; and when receiving a target charging capacity returned by the charging box based on the current charging capacity, acquiring a current charging capacity in real time, and when the current charging capacity reaches a target charging capacity, sending charging stop information to the charging box.

In addition, in order to achieve the above object, the present disclosure also provides a charging box. The Bluetooth earphones comprise a memory, a processor and a charging program stored on the memory and operable on the processor. When the charging program is executed by the processor, the steps of the first type of charging method as described above are realized.

In addition, in order to achieve the above object, the present disclosure also provides Bluetooth earphones. The Bluetooth earphones comprise a memory, a processor and a charging program stored on the memory and operable on the processor. When the charging program is executed by the processor, the steps of the second type of charging method as described above are realized.

In addition, in order to achieve the above object, the present disclosure also provides a charging system which comprises a charging box and Bluetooth earphones, wherein the charging box is a charging box as described above; and the Bluetooth earphones are the Bluetooth earphones as described above.

In addition, in order to achieve the above object, the present disclosure also provides a computer-readable storage medium on which a charging program is stored, and when the charging program is executed by a processor, the steps of the first or second type of charging method as described above are realized.

The present disclosure provides a charging method and system, a charging box and Bluetooth earphones. The charging method is applied to the charging box. When the charging box detected that Bluetooth earphones are placed in the charging box, the current capacity information of the Bluetooth earphones is acquired. The number of Bluetooth earphones is determined according to the current capacity information. If the number of Bluetooth earphones is two, the capacity difference and the total charging capacity required are calculated according to the first current capacity and the second current capacity in the current capacity information. The chargeable capacity of the charging box is acquired, the chargeable capacity is compared with the total charging capacity required and the capacity difference, and the Bluetooth earphones are charged according to the comparison results. In this way, the present disclosure compares the chargeable capacity of the charging box with the required total charging capacity and capacity difference of the Bluetooth earphones, and uses a corresponding charging plan to charge the Bluetooth earphones according to the comparison results, which can realize the reasonable distribution of the electric energy of the charging box and improve the overall energy efficiency of the Bluetooth earphones system.

BRIEF DESCRIPTION OF DRAWINGS

The present invention will hereinafter be described in conjunction with the following drawing figures, wherein like numerals denote like elements, and.

The realization of the object, functional features and advantages of the present disclosure will be further described in conjunction with the embodiments and with reference to the drawings.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

It should be understood that the specific embodiments described herein are only used to explain the present disclosure and are not used to define the present disclosure.

In the prior art, in the daily use of Bluetooth earphones such as TWS earphones which are charged by a charging box, the performance of the whole system of Bluetooth earphones and charging box is often discounted. For example, the charging box does not charge the left and right earphones evenly, resulting in the failure of the left and right earphones to reach the longest standby time after charging. Therefore, how to effectively plan the charging process of Bluetooth earphones and charging box and improve the overall energy efficiency of Bluetooth earphones system is an urgent problem to be solved.

In order to solve the above technical problems, the present disclosure provides a charging method applied to a charging box. When the charging box detected that Bluetooth earphones are placed in the charging box, the current capacity information of the Bluetooth earphones is acquired. The number of Bluetooth earphones is determined according to the current capacity information. If the number of Bluetooth earphones is two, the capacity difference and the total charging capacity required are calculated according to the first current capacity and the second current capacity in the current capacity information. The chargeable capacity of the charging box is acquired, the chargeable capacity is compared with the total charging capacity required and the capacity difference, and the Bluetooth earphones are charged according to the comparison results. In this way, the present disclosure compares the chargeable capacity of the charging box with the required total charging capacity and capacity difference of the Bluetooth earphones, and uses a corresponding charging plan to charge the Bluetooth earphones according to the comparison results, which can realize the reasonable distribution of the electric energy of the charging box and improve the overall energy efficiency of the Bluetooth earphones system.

Figure 1:
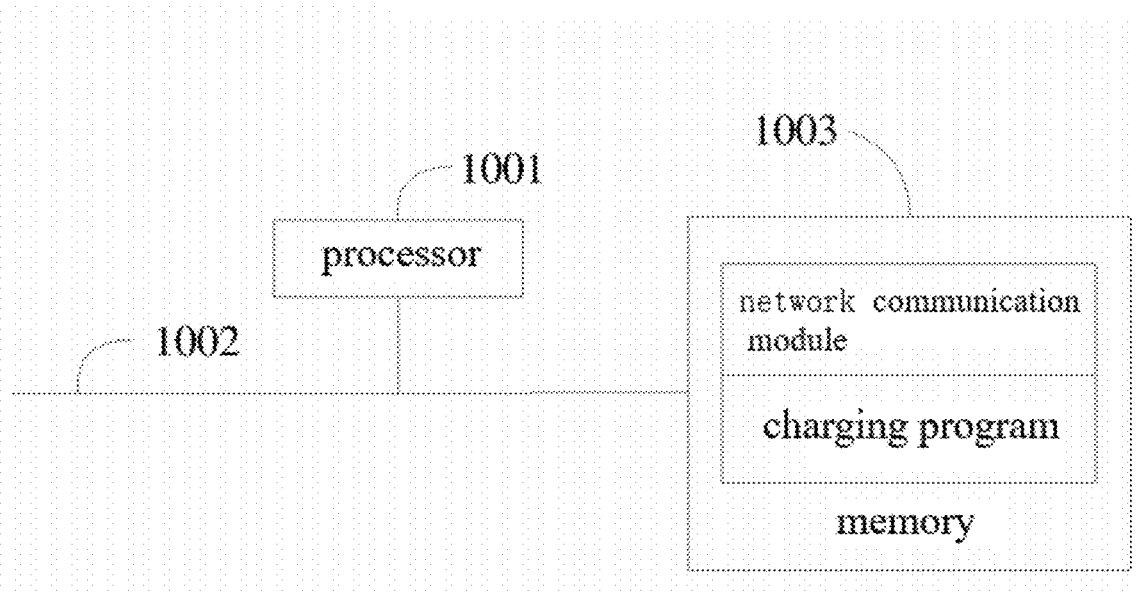
FIG. 1 is a schematic diagram of the terminal structure of the hardware operating environment involved in the embodiments of the present disclosure.

Referring to FIG. 1, which is a schematic diagram of the terminal structure of the hardware operating environment involved in the embodiments of the present disclosure.

In this embodiment of the present disclosure, the terminal is a charging box of Bluetooth earphones or Bluetooth earphones.

As shown in FIG. 1, the terminal may comprise a processor 1001 such as a CPU (central processing unit), a communication bus 1002, and a memory 1003. The communication bus 1002 is configured to realize the connection and communication between these components. The memory 1003 may be a high-speed RAM memory or a stable memory (non-volatile memory), such as a magnetic disk memory. Alternatively, the memory 1003 may be a storage device independent of the above processor 1001.

Those skilled in the art can understand that the terminal structure shown in FIG. 1 does not constitute a limitation on the terminal, and the terminal may comprise more or fewer components than those shown in the FIG. 1, or be a combination of some components, or have different component arrangements.

As shown in FIG. 1, the memory 1003, as a computer storage medium, may comprise a network communication module and a charging program.

In the terminal shown in FIG. 1, if the terminal is the charging box of Bluetooth earphones, the processor 1001 may be configured to call the charging program stored in the memory 1003 and perform the following operations:

when it is detected that Bluetooth earphones are placed in the charging box, acquiring current capacity information of the Bluetooth earphones;

determining a number of Bluetooth earphones according to the current capacity information;

if the number of Bluetooth earphones is two, calculating a capacity difference and a total charging capacity required according to a first current capacity and a second current capacity in the current capacity information; and acquiring a chargeable capacity of the charging box, comparing the chargeable capacity with the total charging capacity required and the capacity difference, and charging the Bluetooth earphones according to comparison results.

Further, the processor 1001 may call the charging program stored in the memory 1003 and perform the following operations:

calculating the capacity difference according to the first current capacity and the second current capacity in the current capacity information and a preset charging efficiency;

acquiring a first total capacity of the Bluetooth earphones corresponding to the first current capacity, and acquiring a second total capacity of the Bluetooth earphones corresponding to the second current capacity;

calculating a first capacity to be charged according to the first total capacity and the first current capacity, and calculating a second capacity to be charged according to the second total capacity and the second current capacity; and calculating the total charging capacity required according to the first capacity to be charged, the second capacity to be charged and the preset charging efficiency.

Further, the processor 1001 may call the charging program stored in the memory 1003 and perform the following operations:

if the chargeable capacity is greater than or equal to the total charging capacity required, charging the two Bluetooth earphones respectively until the charging of the two Bluetooth earphones is completed.

Further, the processor 1001 may call the charging program stored in the memory 1003 and perform the following operations:

if the chargeable capacity is greater than or equal to the capacity difference and less than the total charging capacity required, calculating a target charging capacity of the Bluetooth earphones according to the chargeable capacity, the preset charging efficiency, the first current capacity and the second current capacity;

sending the target charging capacity to the two Bluetooth earphones respectively, and charging the two Bluetooth earphones respectively; and when receiving charging stop information sent by either of the two Bluetooth earphones based on the target charging capacity, stop charging a corresponding Bluetooth earphone according to the charging stop information.

Further, the processor 1001 may call the charging program stored in the memory 1003 and perform the following operations:

if the rechargeable capacity is less than the capacity difference, taking a Bluetooth earphone with a lower capacity in the two Bluetooth earphones as the target Bluetooth earphone; and charging the target Bluetooth earphone, and disconnecting a non-target Bluetooth earphone from a charging circuit.

Further, the processor 1001 may call the charging program stored in the memory 1003 and perform the following operations:

if there is one Bluetooth earphone, charging the one Bluetooth earphone.

Further, the processor 1001 may call the charging program stored in the memory 1003 and perform the following operations:

during the charging process, acquiring the current remaining capacity of the charging box in real time, and stopping charging the Bluetooth earphones when the current remaining capacity is less than or equal to the preset charging termination capacity.

In the terminal shown in FIG. 1, if the terminal is Bluetooth earphones, the processor 1001 can be configured to call the charging program stored in the memory 1003 and perform the following operations:

when it is detected that Bluetooth earphones are placed in the charging box, acquiring a current capacity via a capacity meter and sending it to the charging box; and when receiving a target charging capacity returned by the charging box based on the current charging capacity, acquiring a current charging capacity in real time, and when the current charging capacity reaches a target charging capacity, sending charging stop information to the charging box.

Based on the above hardware structure, various embodiments of the charging method according to the present disclosure are proposed.

The present disclosure provides a charging method applied to a charging box.

Figure 2:
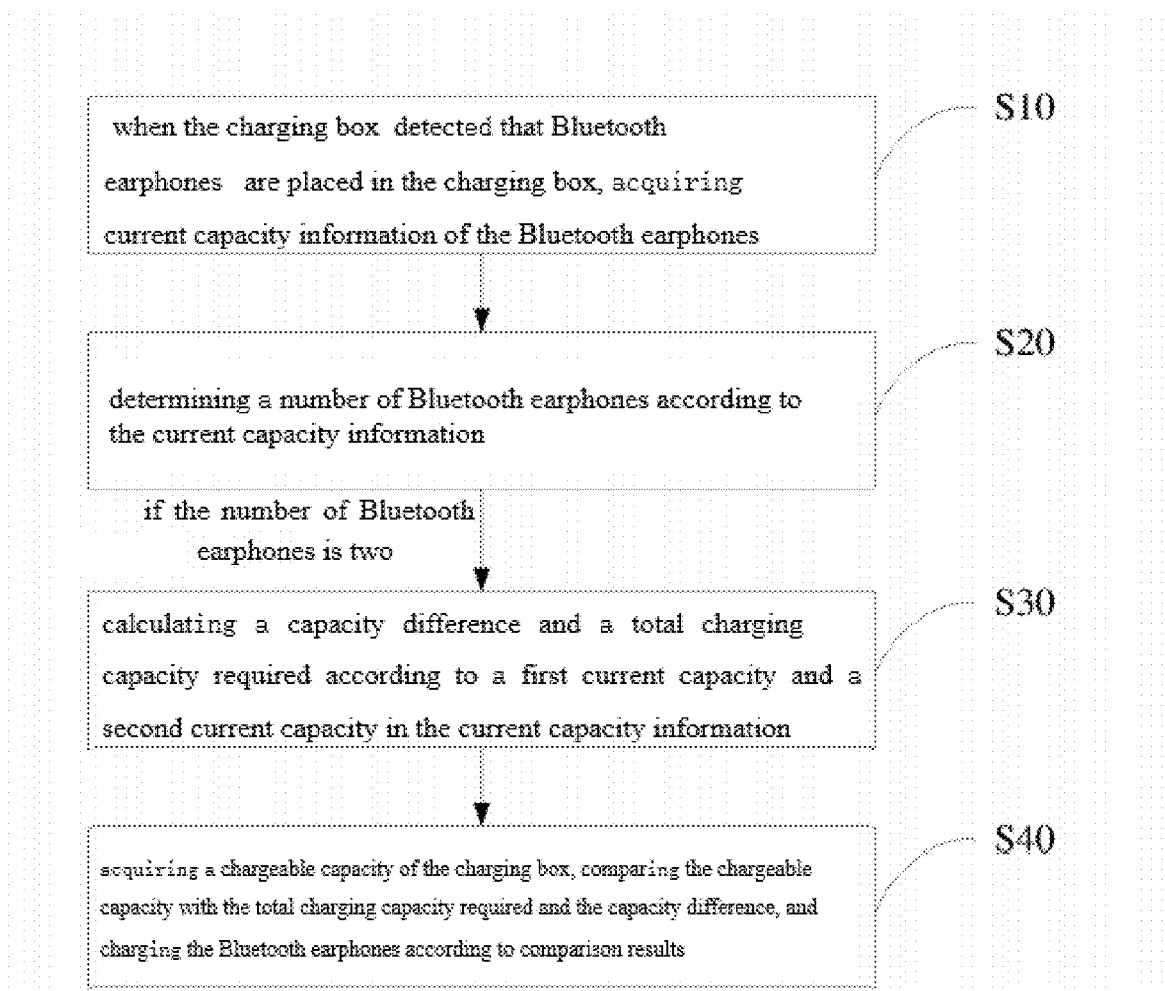
FIG. 2 is a flowchart of a first embodiment of the charging method according to the present disclosure.

Referring to FIG. 2, which is a flowchart of the first embodiment of the charging method applied to a charging box according to the present disclosure.

Figure 3:
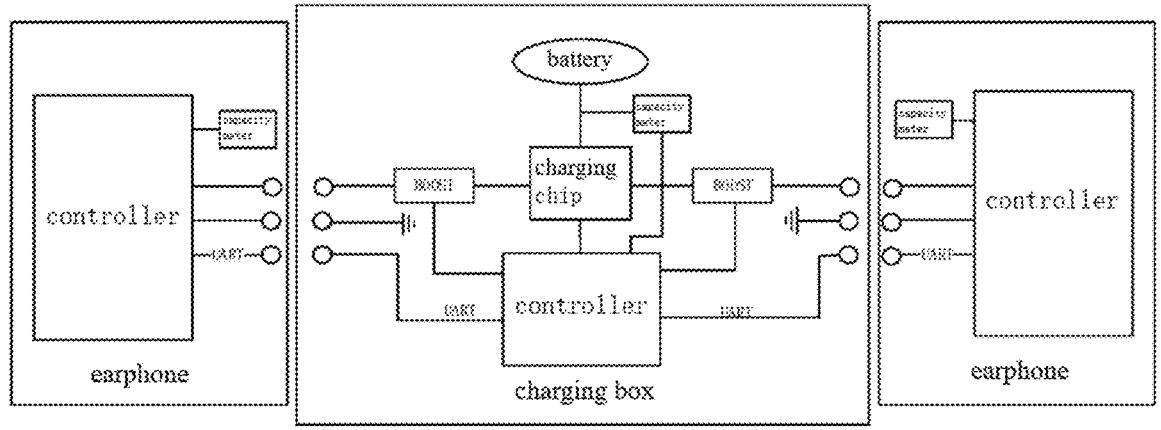
FIG. 3 is a schematic diagram of the system architecture of a charging system according to the present disclosure.

In this embodiment, the charging method is applied to the charging box of the Bluetooth earphones. The charging method comprises:

Step S10: when it is detected that Bluetooth earphones are placed in the charging box, acquiring current capacity information of the Bluetooth earphones;

In this embodiment, when the charging box detected that Bluetooth earphones are placed in the charging box, the current capacity information of the Bluetooth earphones is acquired. This embodiment is applicable to wireless Bluetooth earphones charged by a charging box, such as TWS (true wireless stereo) earphones. As shown in FIG. 3, which is a schematic diagram of the system architecture of a charging system composed of a charging box and Bluetooth earphones. The Bluetooth earphones comprise a master earphone and a slave earphone, which can interact with the charging box independently. Specifically, they can communicate and interact with the charging box through communication methods such as UART (universal asynchronous receiver/transmitter) or I2C (inter-integrated circuit) carrier. In addition, either of the charging box or Bluetooth earphones may have a capacity meter therein configured to acquire their own capacity. When the Bluetooth earphones are placed in the charging box for charging, it will automatically obtain the current capacity via the capacity meter, and then send it to the charging box via a preset communication mode. At this point, the charging box can obtain the current capacity information of the Bluetooth earphones.

Step S20: determining the number of Bluetooth earphones according to the current capacity information;

Then, the number of Bluetooth earphones is determined according to the current capacity information. It is understandable that the number of Bluetooth earphones is the same as the number of current capacity information received. Therefore, the number of Bluetooth earphones can be determined by detecting the number of current capacity information received.

Step S30: if the number of Bluetooth earphones is two, calculating a capacity difference and a total charging capacity required according to a first current capacity and a second current capacity in the current capacity information;

If the number of Bluetooth earphones is two, i.e., the current capacity information includes the current capacities of the two Bluetooth earphones, at this point, the capacity difference and the total charging capacity required can be calculated according to the first current capacity and the second current capacity in the current capacity information. The capacity difference is the capacity difference between the charging capacities of the charging box corresponding to the current capacities of the two Bluetooth earphones, and the total charging capacity required is the capacity that the charging box must provide when the two Bluetooth earphones are fully charged.

Specifically, the step S30 comprises:

step a31: calculating the capacity difference according to the first current capacity and the second current capacity in the current capacity information and a preset charging efficiency;

step a32: acquiring a first total capacity of the Bluetooth earphones corresponding to the first current capacity, and acquiring a second total capacity of the Bluetooth earphones corresponding to the second current capacity;

step a33: calculating a first capacity to be charged according to the first total capacity and the first current capacity, and calculating a second capacity to be charged according to the second total capacity and the second current capacity; and step a34: calculating the total charging capacity required according to the first capacity to be charged, the second capacity to be charged and the preset charging efficiency.

In this embodiment, the calculation process of the capacity difference and the total charging capacity required is as follows:

According to the first current capacity and the second current capacity in the current capacity information and the preset charging efficiency, the capacity difference is calculated. Since the capacity of the charging box cannot be 100% converted to the capacity of the Bluetooth earphones, that is, there is a corresponding charging efficiency during the charging process, the preset charging efficiency may be recorded as E, $0<E<1$. For the sake of explanation, the first current capacity is recorded as $A_L$ and the second current capacity $B_L$, and the capacity difference which is equal to $|(A_L-B_L)\div E|$ can be obtained by calculation.

The first total capacity of the Bluetooth earphones corresponding to the first current capacity is acquired, and the second total capacity of the Bluetooth earphones corresponding to the second current capacity is acquired. For the sake of explanation, the first total capacity is recorded as A, and the second total capacity is recorded as B. Then, the first capacity to be charged is calculated according to the first total capacity and the first current capacity, and the second capacity to be charged is calculated according to the second total capacity and the second current capacity. The first capacity to be charged is equal to $A-A_L$, and the second capacity to be charged is equal to $B-B_L$.

Finally, according to the first capacity to be charged, the second capacity to be charged and the preset charging efficiency, the total charging capacity required is calculated. Since the capacity of the charging box cannot be 100% converted to the capacity of the Bluetooth earphones, that is, there is a corresponding charging efficiency during the charging process, the preset charging efficiency can be recorded as E, $0<E<1$, and the total charging capacity required is equal to $[(A-A_L)+(B-B_L)]\div E$.

It should be noted that the execution order of step a31 and steps a32 to a34 is not limited.

Step S40: acquiring a chargeable capacity of the charging box, comparing the chargeable capacity with the total charging capacity required and the capacity difference, and charging the Bluetooth earphones according to comparison results.

The chargeable capacity of the charging box is acquired. Specifically, a third current capacity $P_L$ of the charging box can be obtained via the capacity meter in the charging box, and then the chargeable capacity $P_L-P_T$ can be calculated according to the third current capacity $P_L$ and a preset charging termination capacity $P_T$. The preset charging termination capacity $P_T$ is a preset value set for protecting the battery of charging box. When the remaining capacity of the charging box is lower than the termination capacity, the charging will be stopped. The preset termination capacity $P_T$ can typically be set to 5%~10% of the total capacity P of the charging box.

Then, the chargeable capacity is compared with the total charging capacity required and the capacity difference, and the Bluetooth earphones are charged according to the comparison results. It is understandable that the total charging capacity required is greater than the capacity difference.

If the chargeable capacity is greater than or equal to the required total charging capacity, it means that the chargeable capacity of the charging box is enough to fully charge the two Bluetooth earphones. At this point, the two Bluetooth earphones are charged respectively until the charging of the two Bluetooth earphones is completed.

If the chargeable capacity is greater than or equal to the capacity difference and less than the total charging capacity required, it means that the chargeable capacity of the charging box is not enough to fully charge the two Bluetooth earphones at the same time, but the chargeable capacity is greater than or equal to the capacity difference. At this point, the corresponding charging plan is to balance the capacities of the two Bluetooth earphones so that the capacities of the two Bluetooth earphones after charging are the same. Specifically, a target charging capacity of the Bluetooth earphones is calculated according to the chargeable capacity, the preset charging efficiency, the first current capacity and the second current capacity; then, the target charging capacity is sent to the two Bluetooth earphones respectively, and the two Bluetooth earphones are charged respectively; when receiving charging stop information sent by either of the two Bluetooth earphones based on the target charging capacity, the charging of the corresponding Bluetooth earphone stops according to the charging stop information.

If the chargeable capacity is less than the capacity difference, only the Bluetooth earphone with a lower current capacity will be charged, and the Bluetooth earphone with a lower capacity in the two Bluetooth earphones will be used as the target Bluetooth earphone; the target Bluetooth earphone is charged, and disconnect the non-target Bluetooth earphone from the charging circuit.

The specific charging planning data generation process and charging control method may refer to the second to fourth embodiments below, which will not be repeated here.

This embodiment of the present disclosure provides a charging method applied to a charging box. When the charging box detected that Bluetooth earphones are placed in the charging box, the current capacity information of the Bluetooth earphones is acquired. The number of Bluetooth earphones is determined according to the current capacity information. If the number of Bluetooth earphones is two, the capacity difference and the total charging capacity required are calculated according to the first current capacity and the second current capacity in the current capacity information. The chargeable capacity of the charging box is acquired, the chargeable capacity is compared with the total charging capacity required and the capacity difference, and the Bluetooth earphones are charged according to the comparison results. In this way, this embodiment of the present disclosure compares the chargeable capacity of the charging box with the required total charging capacity and capacity difference of the Bluetooth earphones, and uses a corresponding charging plan to charge the Bluetooth earphones according to the comparison results, which can realize the reasonable distribution of the electric energy of the charging box and improve the overall energy efficiency of the Bluetooth earphones system.

Further, based on the above first embodiment, a second embodiment of the charging method according to the present disclosure is proposed.

In this embodiment, step S40 may comprise:

Step a41: if the chargeable capacity is greater than or equal to the total charging capacity required, charging the two Bluetooth earphones respectively until the charging of the two Bluetooth earphones is completed.

In this embodiment, if the chargeable capacity is greater than or equal to the total charging capacity required, i.e., $P_L-P_T \geq [A-A_L)+(B-B_L)] \div E$, it indicates that the chargeable capacity of the charging box is enough to fully charge two Bluetooth earphones. At this point, the corresponding charging plan is full charge, that is, the capacity of the Bluetooth earphone corresponding to the first current capacity reaches its corresponding first total capacity, and the capacity of the Bluetooth earphone corresponding to the second current capacity reaches its corresponding second total capacity. Specifically, the two Bluetooth earphones are charged respectively until the charging of the two Bluetooth earphones is completed.

Further, based on the above first embodiment, a third embodiment of the charging method according to the present disclosure is proposed.

Figure 4:
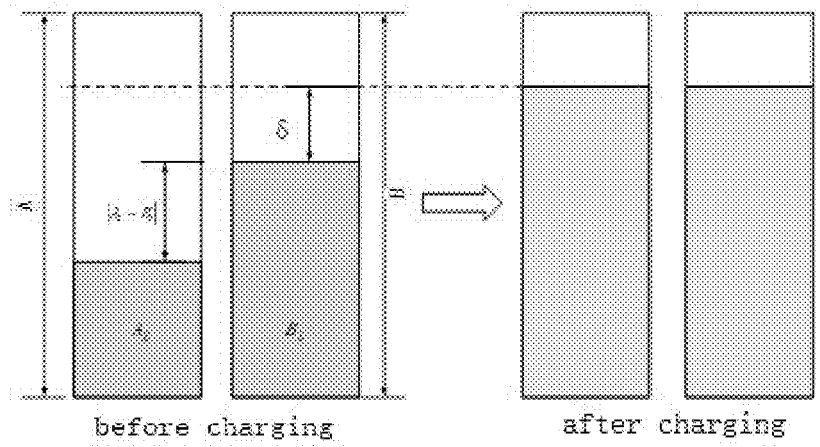
FIG. 4 is an explanatory diagram of a charging plan involved in a charging method according to the present disclosure.

In this embodiment, step S40 may comprise:

Step a42: if the chargeable capacity is greater than or equal to the capacity difference and less than the required total charge, calculate a target charging capacity of the Bluetooth earphones according to the chargeable capacity, the preset charge efficiency, the first current capacity and the second current capacity;

In this embodiment, if the chargeable capacity is greater than or equal to the capacity difference and less than the required total charge, i.e., $|(A_L-B_L) \div E| \leq P_L-P_T < [(A-A_L)+(B-B_L)] \div E$, it indicates that the chargeable capacity of the charging box is not enough to fully charge the two Bluetooth earphones at the same time, but the chargeable capacity is greater than or equal to the capacity difference. At this point, the corresponding charging plan is to balance the capacities of the two Bluetooth earphones so that the capacities of the two Bluetooth earphones after charging are the same, and the user's bad experience of short using time caused by the non-uniform capacities of the two Bluetooth earphones can be avoided. The charging plan is shown in FIG. 4.

Specifically, the target charging capacity of the Bluetooth earphones is calculated according to the chargeable capacity, the preset charging efficiency, the first current capacity and the second current capacity.

The required charging capacity δ of the Bluetooth earphone with a greater current capacity can be calculated according to the chargeable capacity $P_L-P_T$, the preset charging efficiency E, the first current capacity $A_L$ and the second current capacity $B_L$. The calculation formula is as follows:

$$\delta = \frac{(P_L - P_T)^* E - |A_L - B_L|}{2}$$

Assuming that the first current capacity is less than the second current capacity, the target charging quantity is equal to $B_L + \delta$.

Step a43: sending the target charging capacity to the two Bluetooth earphones respectively, and charging the two Bluetooth earphones respectively; and Step a44: when receiving charging stop information sent by either of the two Bluetooth earphones based on the target charging capacity, stop charging a corresponding Bluetooth earphone according to the charging stop information.

Since the target charging capacities of the two Bluetooth earphones are the same, the calculated target charging capacities can be sent to the two Bluetooth earphones respectively, and the two Bluetooth earphones are charged respectively.

At this point, when the Bluetooth earphones receives the target charging capacity sent by the charging box, it acquires the current charging capacity in real time, and sends the charging stop information to the charging box when the current charging capacity reaches the target charging capacity (that is, the current charging capacity is greater than or equal to the target charging capacity).

Correspondingly, when the charging box receives the charging stop information sent by either of the two Bluetooth earphones based on the target charging capacity, it stops charging the corresponding Bluetooth earphone according to the charging stop information.

In this way, if the chargeable capacity is greater than or equal to the capacity difference and less than the total charging capacity required, that is, the chargeable capacity of the charging box is not enough to fully charge two Bluetooth earphones at the same time, but the chargeable capacity is greater than or equal to the capacity difference, the corresponding charging plan is to balance the capacity of the two Bluetooth earphones so that the capacities of the two Bluetooth earphones after charging are the same, and thus the user's bad experience of short using time caused by the non-uniform capacity of the two Bluetooth earphones can be avoided, the reasonable distribution of electric energy of the charging box can be realized, and the overall energy efficiency of the Bluetooth earphones system can be improved.

Further, based on the above first embodiment, a fourth embodiment of the charging method according to the present disclosure is proposed.

In this embodiment, step S40 may comprise:

Step a45: if the rechargeable capacity is less than the capacity difference, taking a Bluetooth earphone with a lower capacity in the two Bluetooth earphones as the target Bluetooth earphone; and Step a46: charging the target Bluetooth earphone, and disconnecting a non-target Bluetooth earphone from a charging circuit.

Figure 5:
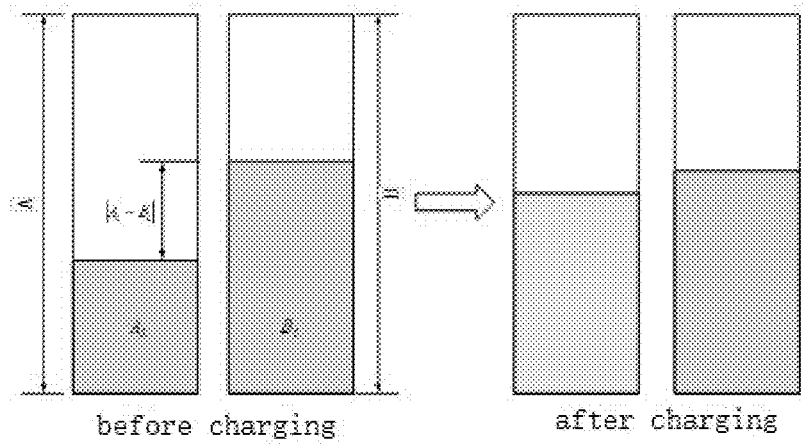
FIG. 5 is an explanatory diagram of another charging plan involved in a charging method according to the present disclosure.

In this embodiment, if the chargeable capacity is less than the capacity difference, i.e., $P_L - P_T \leq |(A_L - B_L) \div E|$, at this point, in order to ensure that the difference of the usable time durations of the charged Bluetooth earphones is small, the charging plan may be only charging the Bluetooth earphone with a lower current capacity. The description of the charging plan is shown in FIG. 5. Specifically, the Bluetooth earphone with a lower capacity in the two Bluetooth earphones may be used as the target Bluetooth earphone; then, the target Bluetooth earphone is charged and disconnect the non-target Bluetooth earphone from the charging circuit. Correspondingly, the charging capacity that the target Bluetooth earphone can obtain is $(P_L - P_T)*E$.

In this way, when the chargeable capacity is less than the capacity difference, only the Bluetooth earphone with a lower capacity can be charged, which can ensure that the difference of the usable time durations of the charged Bluetooth earphones is small, thereby realizing the reasonable distribution of the capacity of the charging box, and improving the overall energy efficiency of the Bluetooth earphones system.

Further, based on the above first embodiment, a fifth embodiment of the charging method according to the present disclosure is proposed.

In this embodiment, after the step S20, the charging method further comprises:

Step A: if there is one Bluetooth earphone, charging the one Bluetooth earphone.

In this embodiment, when the number of Bluetooth earphones is determined to be one according to the current capacity information, at this point, it is only necessary to charge the one Bluetooth earphone as much as possible. It should be noted that during the specific implementation, in order to protect the battery of the charging box, the charging box can charge the single Bluetooth earphone as much as possible on the premise that its own remaining capacity is higher than the preset charging termination capacity.

Further, based on the above embodiments, a sixth embodiment of the charging method according to the present disclosure is proposed.

In this embodiment, after step S40 of the first embodiment, or after step A41 of the second embodiment, or after step a44 of the third embodiment, or after step a46 of the fourth embodiment, or after step A of the fifth embodiment, the charging method further comprises:

Step B: during the charging process, acquiring the current remaining capacity of the charging box in real time, and stopping charging the Bluetooth earphones when the current remaining capacity is less than or equal to a preset charging termination capacity.

In this embodiment, in order to protect the battery of the charging box, a preset charging termination capacity $P_T$ is usually set. The preset charging termination capacity $P_T$ may typically be set to 5%~10% of the total capacity P of the charging box. When the remaining capacity of the charging box is lower than the charging termination capacity, the charging of the Bluetooth earphones should stop to avoid damage to the battery of the charging box.

Specifically, during the charging process, the current remaining capacity of the charging box is acquired in real time, and the charging of the Bluetooth earphones stops when the current remaining capacity is less than or equal to the preset charging termination capacity.

In this way, when the current remaining capacity of the charging box is less than or equal to the preset charging termination capacity, the charging of the Bluetooth earphones stops to protect the battery of the charging box.

The present disclosure provides a charging method applied to Bluetooth earphones.

In this embodiment, the charging method is applied to the Bluetooth earphones. The charging method comprises:

when it is detected that Bluetooth earphones are placed in the charging box, acquiring a current capacity via a capacity meter and sending it to the charging box; and when receiving a target charging capacity returned by the charging box based on the current charging capacity, acquiring a current charging capacity in real time, and when the current charging capacity reaches a target charging capacity, sending charging stop information to the charging box.

In this embodiment, when it is detected that Bluetooth earphones are placed in the charging box, the current capacity is acquired via the capacity meter and then sent to the charging box, so that the charging box can carry out charging planning based on the current capacity information, determine the target charging capacity of the Bluetooth earphones, and send it to the Bluetooth earphones. Then, when the Bluetooth earphones receive the target charging capacity returned by the charging box based on the current charging capacity, the current charging capacity is acquired in real time, and the charging stop information is sent to the charging box when the current charging capacity reaches the target charging capacity.

In this embodiment, when the Bluetooth earphones are placed in the charging box, the current capacity is acquired and then sent to the charging box, so that the charging box can carry out charging planning. Then, when receiving a target charging capacity returned by the charging box based on the current charging capacity, the current charging capacity is acquired in real time, and when the current charging capacity reaches the target charging capacity, the charging stop information is sent to the charging box to stop charging. In this embodiment, the charging box can reasonably distribute the capacity of the charging box based on the current capacities of the Bluetooth earphones, and stops charging when the charging capacity of the Bluetooth earphones reach a target charging capacity planned by the charging box. In this way, the overall energy efficiency of the Bluetooth earphones system can be improved.

The present disclosure also provides a charging system, which comprises a charging box and Bluetooth earphones.

The charging box is the charging box as described above, and is configured to perform the steps in the embodiments of the first type of charging method as described above. The specific functions and implementation process may refer to the above embodiments and will not be repeated here.

The Bluetooth earphones are the Bluetooth earphones as described above, and is configured to perform the steps in the embodiments of the second type of charging method as described above, namely, when it is detected that Bluetooth earphones are placed in the charging box, acquiring a current capacity via a capacity meter and sending it to the charging box; and when receiving a target charging capacity sent by the charging box, acquiring a current charging capacity in real time, and when the current charging capacity reaches a target charging capacity, sending charging stop information to the charging box. The specific functions and implementation process may refer to the above embodiments and will not be repeated here.

This embodiment provides a charging system, which comprises a charging box and Bluetooth earphones. By constructing the charging system, the capacity of the charging box can be reasonably distributed and the overall energy efficiency of the Bluetooth earphones system can be improved.

The present disclosure also provides a computer-readable storage medium on which a charging program is stored. When the charging program is executed by a processor, the steps of the first type of charging method as described in any of the above embodiments are realized.

The specific embodiments of the computer-readable storage medium of the present disclosure are basically the same as the above embodiments of the charging method, and will not be repeated here.

The present disclosure also provides a computer-readable storage medium on which a charging program is stored. When the charging program is executed by a processor, the steps of the second type of charging method as described in any of the above embodiments are realized.

The specific embodiments of the computer-readable storage medium of the present disclosure are basically the same as the above embodiments of the charging method, and will not be repeated here.

It should be noted that, the terms "comprise", "include" or any other variants used herein are intended to cover non-exclusive inclusion, so that the process, method, article or apparatus including a series of elements may not only include those elements, but may also include other elements not stated explicitly, or elements inherent to the process, method, articles or apparatus. Without more limitations, an element defined by the phrase "comprising a . . . " does not exclude the case that there are other same elements in the process, method, article or system including the element.

The above serial number of the embodiments of the present disclosure is only for description and does not represent the advantages and disadvantages of the embodiments.

Through the above description of the embodiments, those skilled in the art can clearly understand that the above embodiment method can be implemented by means of software plus the necessary general hardware platform. Of course, it can also be implemented by hardware, but in many cases, the former is the better implementation mode. Based on this understanding, the technical solution of the present disclosure, the essence or the part that contributes to the prior art, can be embodied in the form of a software product, which is stored on the above storage medium (such as ROM/RAM, magnetic disc, optical disc), and includes instructions to enable a mobile terminal (which may be a mobile phone, a computer, a server, an air conditioner, or a network device, etc.) to execute the method of each embodiment of the present disclosure.

The above only describes the preferred embodiments of the present disclosure, and does not limit the scope of the patent of the present disclosure. All equivalent substitutions of structure or process made by using the contents of the description and drawings of the present disclosure, or direct or indirect applications in other related technical fields, shall all fall within the scope of protection scope of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A charging method, applied to a charging box, comprising the following steps:
   when the charging box detected that short-range wireless earphones are placed in the charging box, acquiring current capacity information of the short-range wireless earphones;
   determining a number of Short-range wireless earphones according to the current capacity information;
   if the number of Short-range wireless earphones is two, calculating a capacity difference and a total charging capacity required according to a first current capacity and a second current capacity in the current capacity information; and
   acquiring a chargeable capacity of the charging box, comparing the chargeable capacity with the total charging capacity required and the capacity difference, and charging the Short-range wireless earphones according to comparison results,
   the step of charging the Short-range wireless earphones according to comparison results comprises:
   if the chargeable capacity is greater than or equal to the total charging capacity required, charging the two Short-range wireless earphones respectively until charging of the two Short-range wireless earphones is completed,
   if the chargeable capacity is greater than or equal to the capacity difference and less than the total charging capacity required, calculating a target charging capacity of the Short-range wireless earphones according to the chargeable capacity, the preset charging efficiency, the first current capacity and the second current capacity;

sending the target charging capacity to the two Short-range wireless earphones respectively, and charging the two Short-range wireless earphones respectively; wherein the target charging capacity sent to the two Short-range wireless earphones is the same, and when receiving charging stop information sent by either of the two Short-range wireless earphones based on the target charging capacity, stop charging a corresponding Short-range wireless earphone according to the charging stop information, if the rechargeable capacity is less than the capacity difference, taking a Short-range wireless earphone with a lower capacity in the two Short-range wireless earphones as the target Short-range wireless earphone; and charging the target Short-range wireless earphone, and disconnecting a non-target Short-range wireless earphone from a charging circuit.

2. The charging method according to claim 1, wherein the step of calculating a capacity difference and a total charging capacity required according to the first current capacity and the second current capacity in the current capacity information comprises:

calculating the capacity difference according to the first current capacity and the second current capacity in the current capacity information and a preset charging efficiency;

acquiring a first total capacity of the Short-range wireless earphones corresponding to the first current capacity, and acquiring a second total capacity of the Short-range wireless earphones corresponding to the second current capacity;

calculating a first capacity to be charged according to the first total capacity and the first current capacity, and calculating a second capacity to be charged according to the second total capacity and the second current capacity; and calculating the total charging capacity required according to the first capacity to be charged, the second capacity to be charged and the preset charging efficiency.

3. The charging method according to claim 1, wherein after the step of determining the number of Short-range wireless earphones according to the current capacity information, the method further comprises:

if there is one Short-range wireless earphone, charging the one Short-range wireless earphone.

4. A charging box, comprising a memory, a processor and a charging program stored on the memory and operable on the processor, wherein when the charging program is executed by the processor, steps of the charging method according to claim 1 are realized.

5. A charging box, comprising a memory, a processor and a charging program stored on the memory and operable on the processor, wherein when the charging program is executed by the processor, steps of the charging method according to claim 2 are realized.

6. A charging box, comprising a memory, a processor and a charging program stored on the memory and operable on the processor, wherein when the charging program is executed by the processor, steps of the charging method according to claim 3 are realized.

7. A charging method, applied to Short-range wireless earphones, comprising the following steps:

when it is detected that Short-range wireless earphones are placed in the charging box, acquiring a current capacity via a capacity meter and sending it to the charging box;

the charging box adopts the charging method according to claim 1, and when receiving a target charging capacity returned by the charging box based on the current charging capacity, acquiring a current charging capacity in real time, and when the current charging capacity reaches a target charging capacity, sending charging stop information to the charging box, wherein the target charging capacity is calculated as follows: if the chargeable capacity of the charging box is greater than or equal to the capacity difference of the two Short-range wireless earphones and less than the total charging capacity of the two Short-range wireless earphones required, calculates the target charging capacity according to the chargeable capacity, the preset charging efficiency, and current capacity of the two Short-range wireless earphones.

8. Short-range wireless earphones, comprising a memory, a processor and a charging program stored on the memory and operable on the processor, wherein when the charging program is executed by the processor, steps of the charging method according to claim 7 are realized.

* * * * *